June 25, 1968 W. F. WOLFE ET AL 3,389,810
PALLETIZING AND DEPALLETIZING EQUIPMENT
Filed Oct. 23, 1964 14 Sheets-Sheet 5

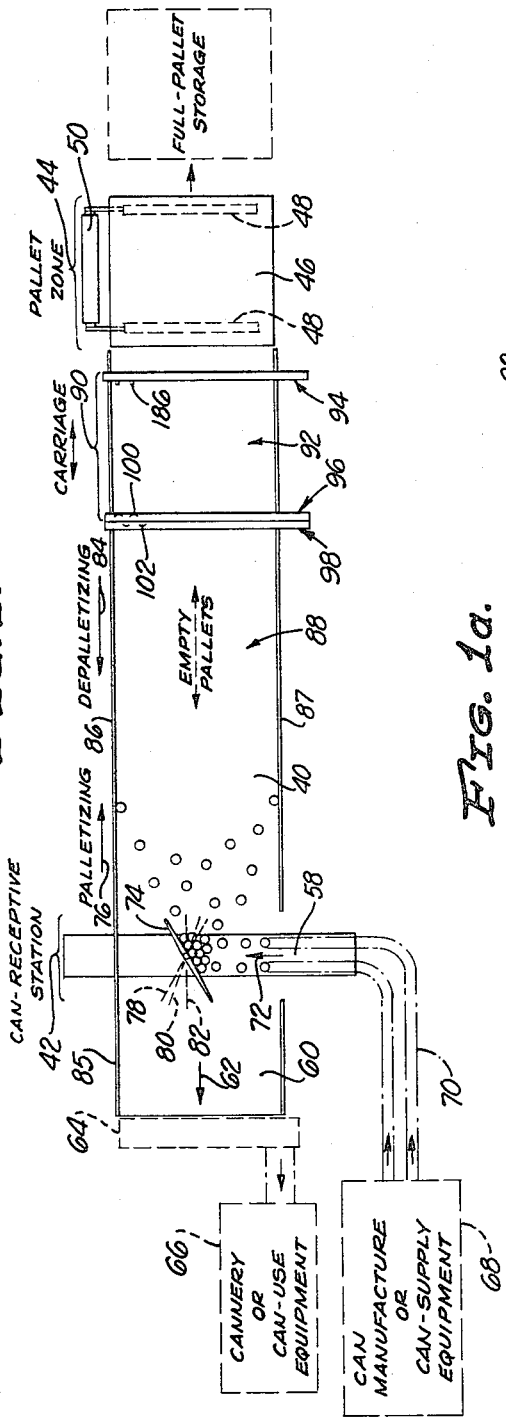

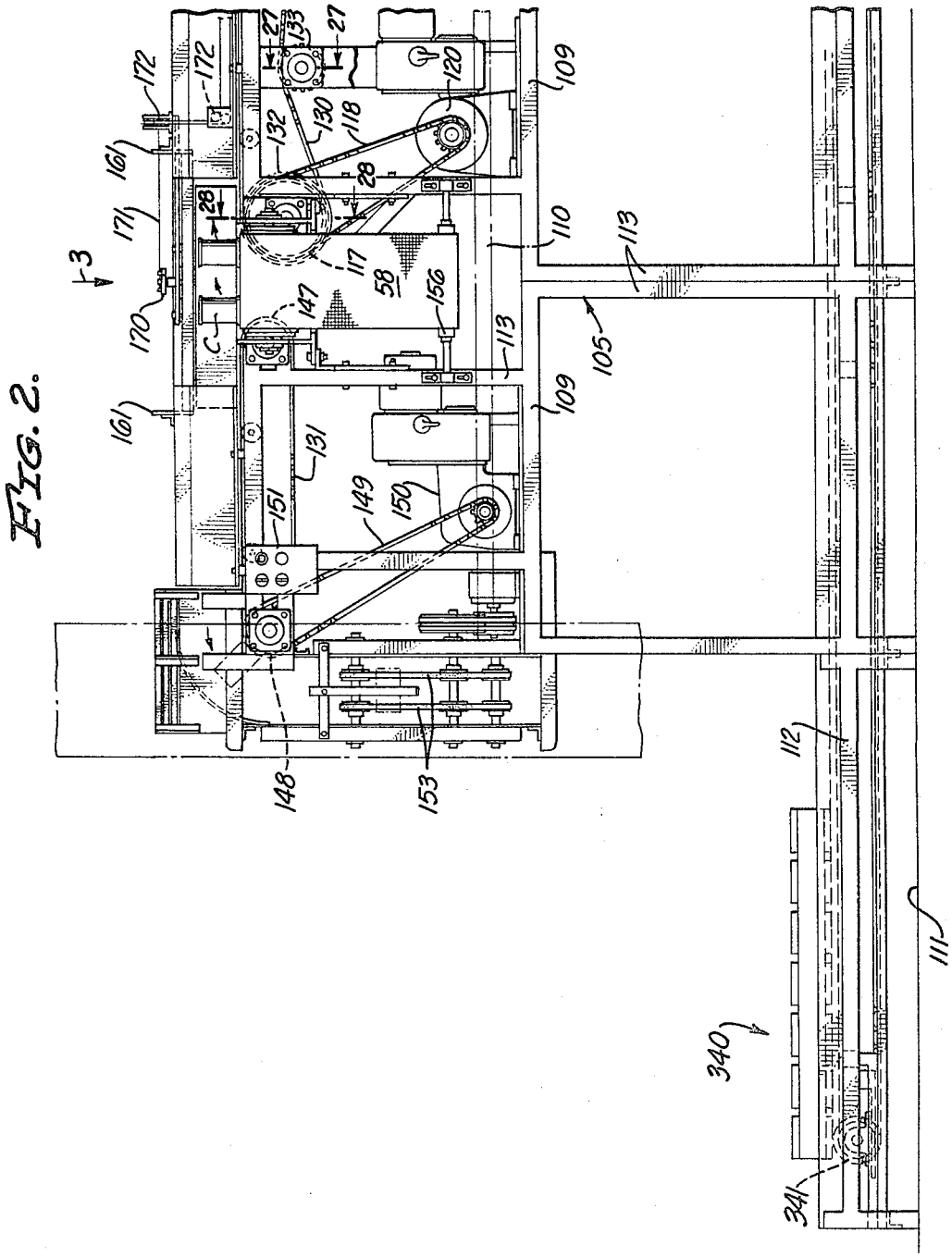

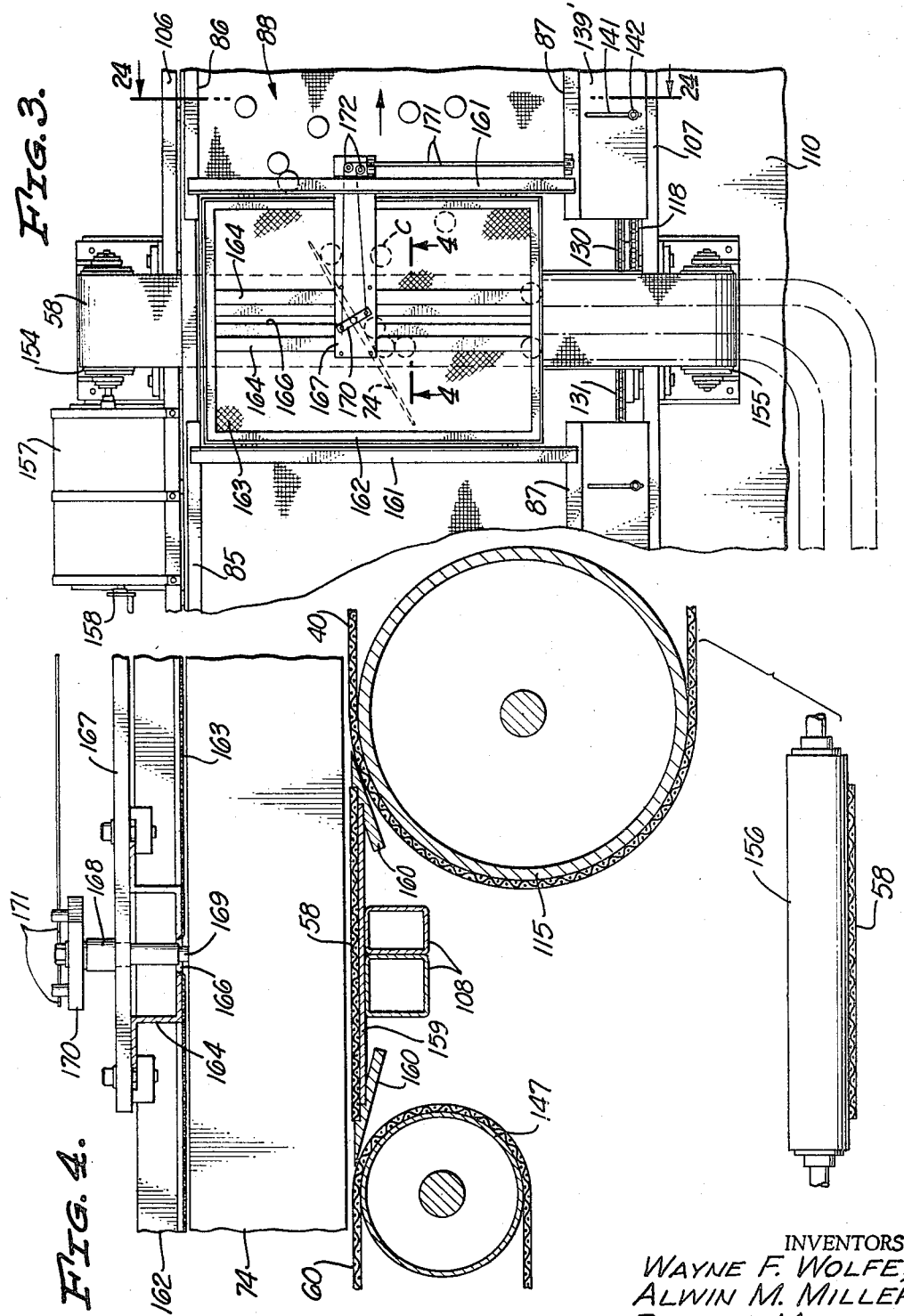

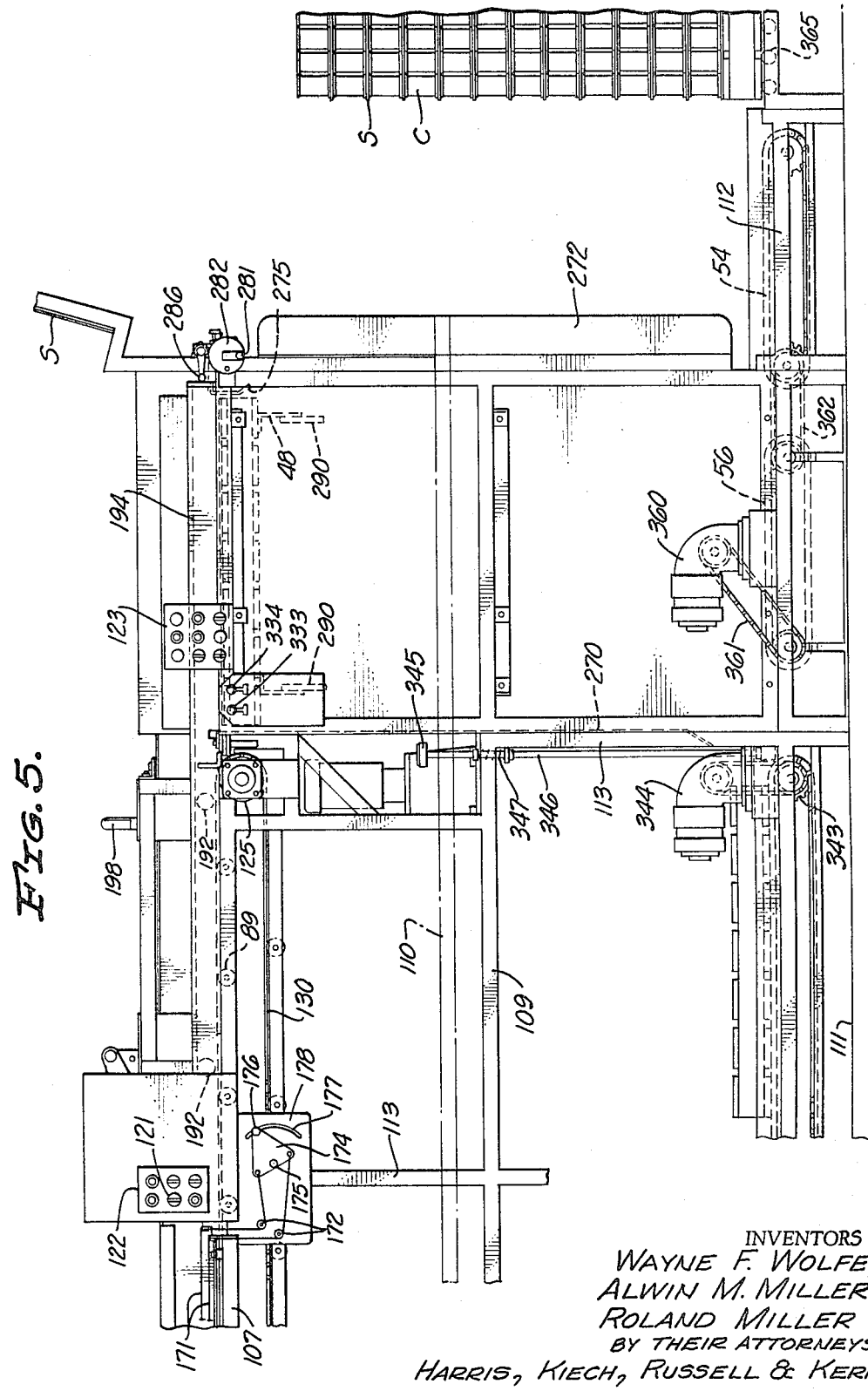

FIG. 6.

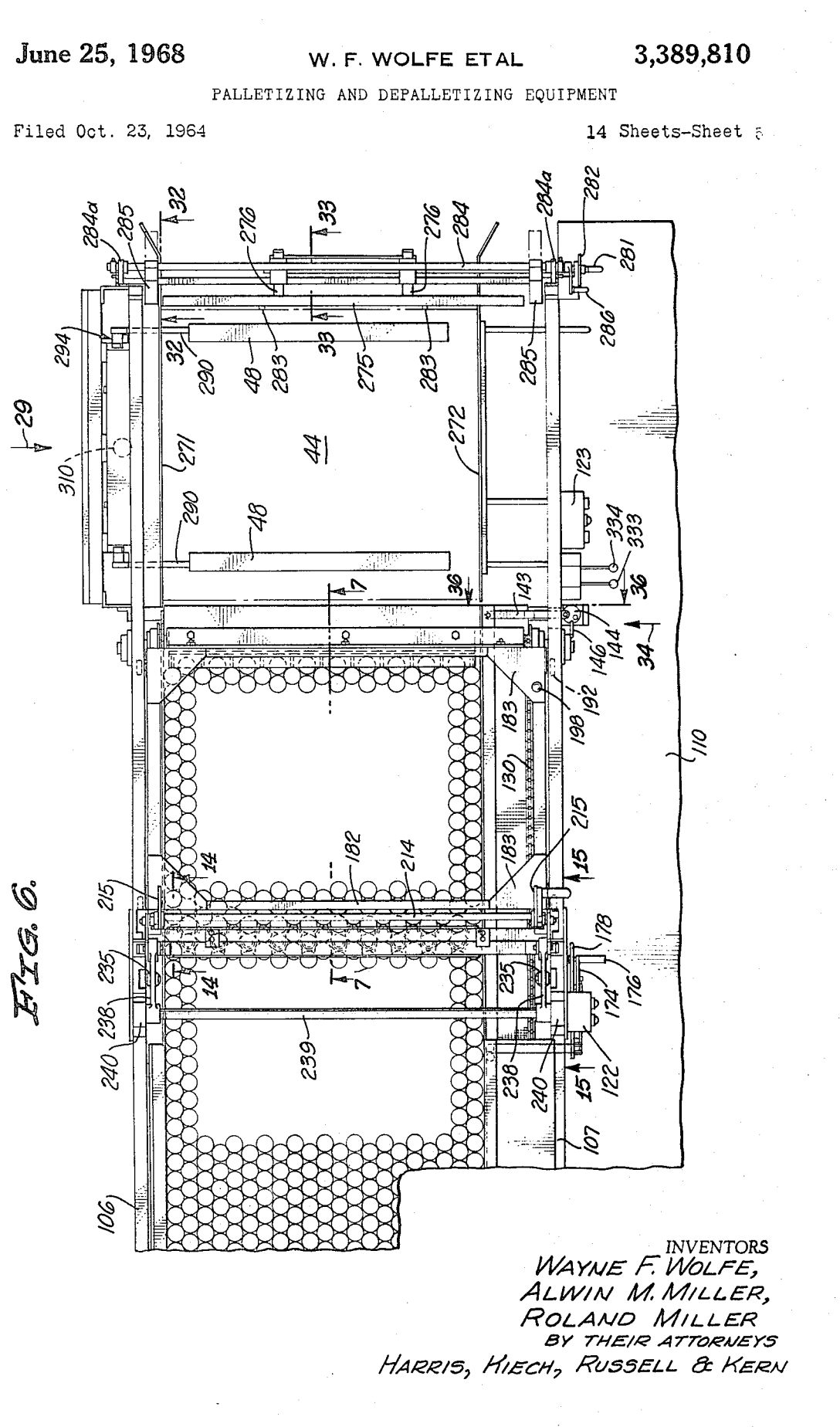

INVENTORS
WAYNE F. WOLFE,
ALWIN M. MILLER,
ROLAND MILLER
BY THEIR ATTORNEYS
HARRIS, KIECH, RUSSELL & KERN

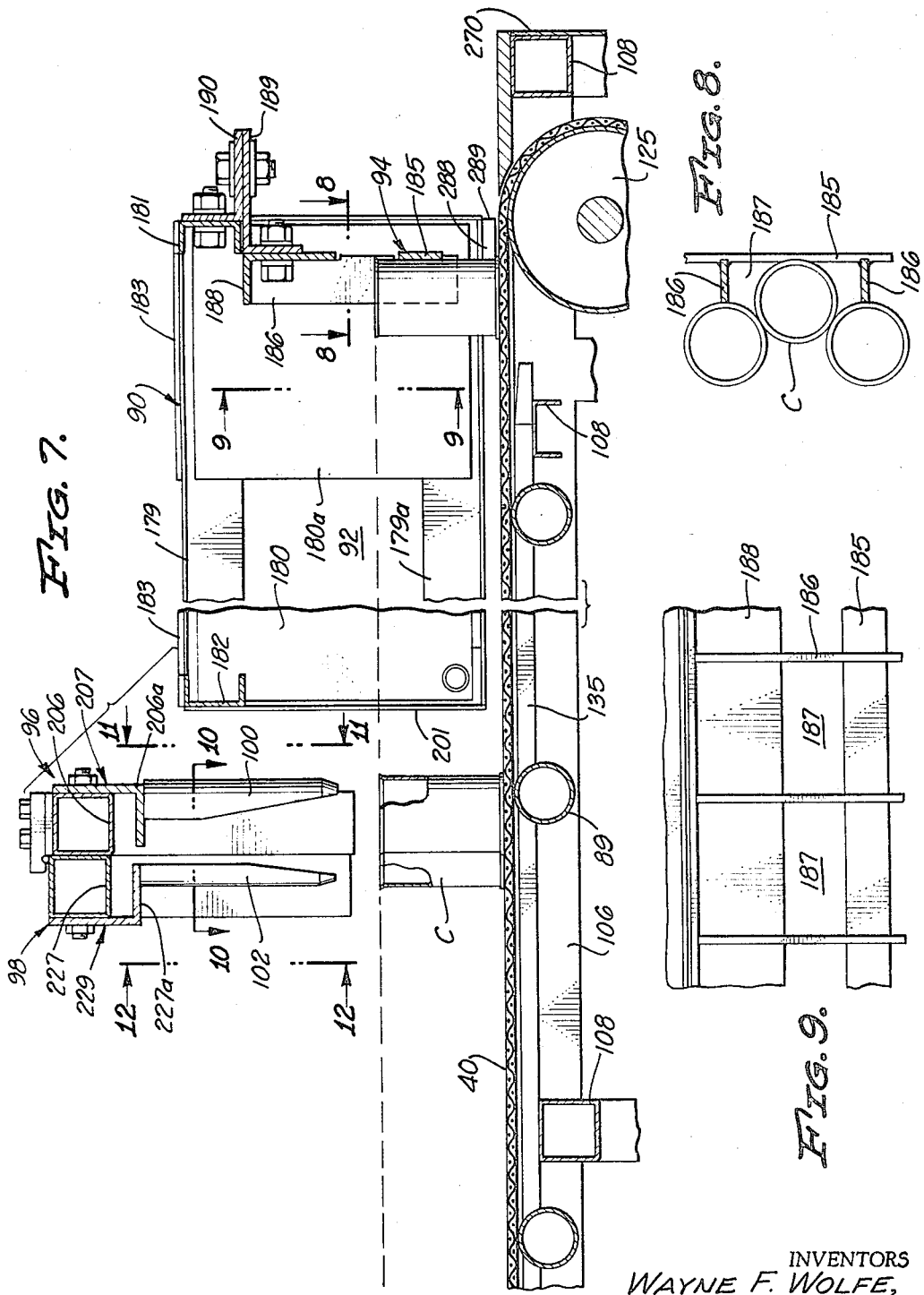

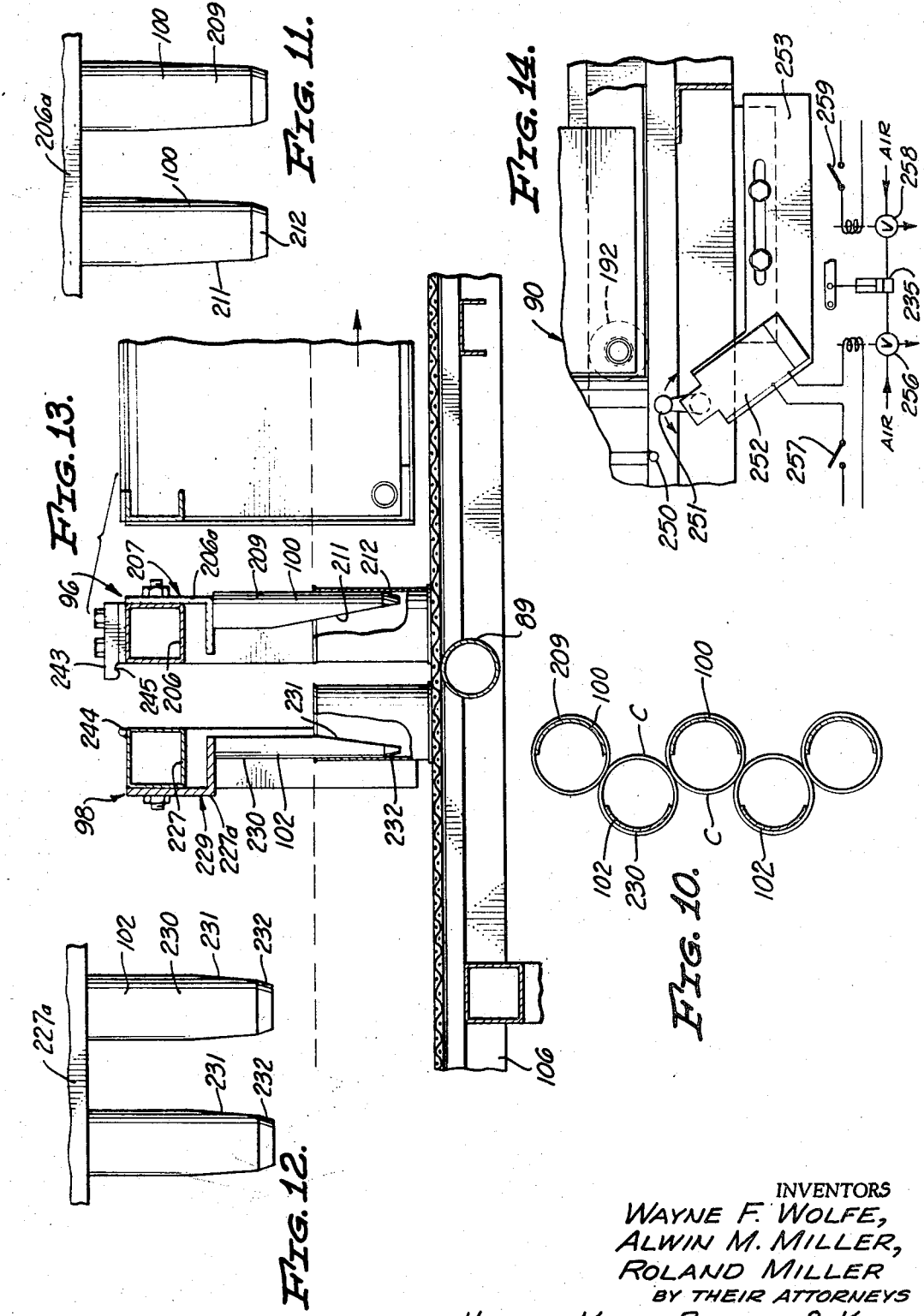

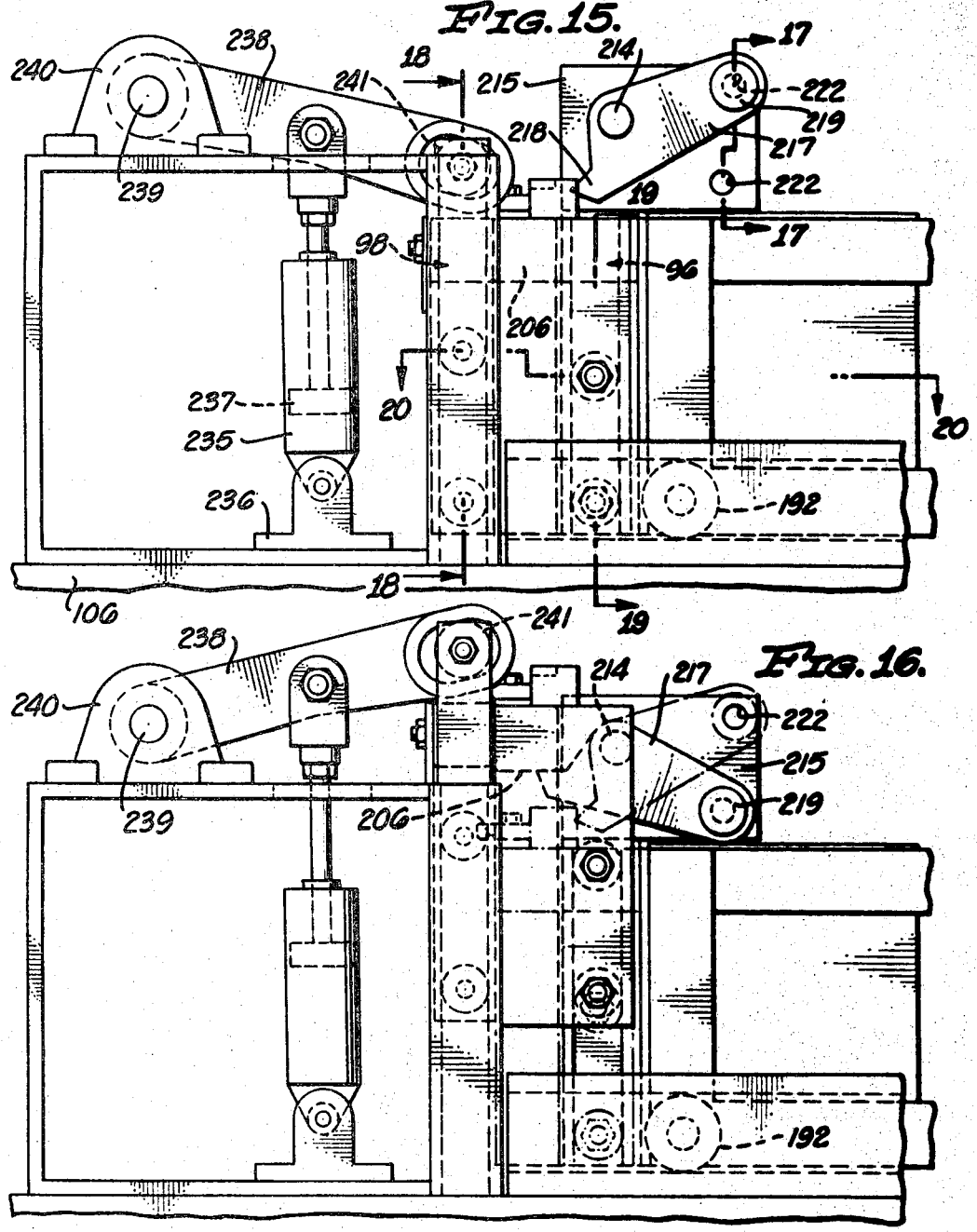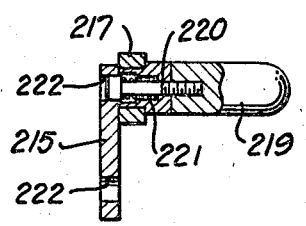

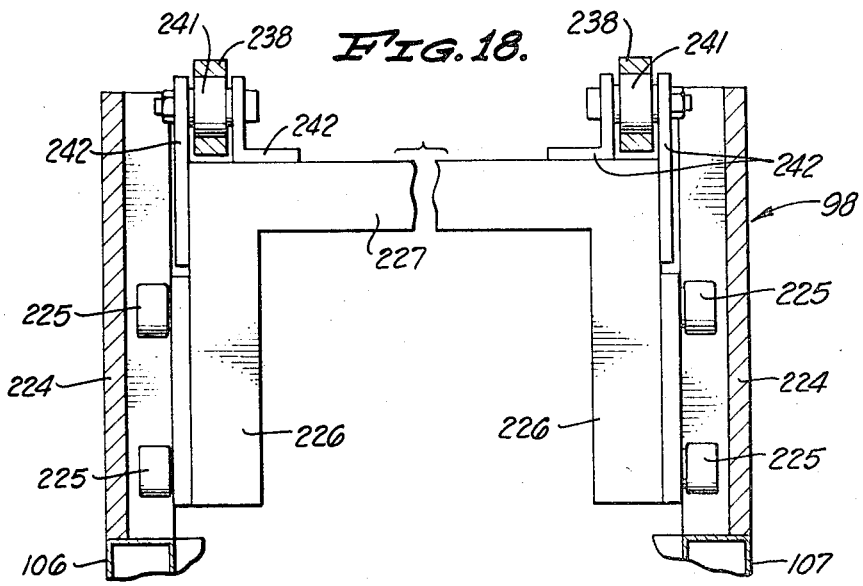
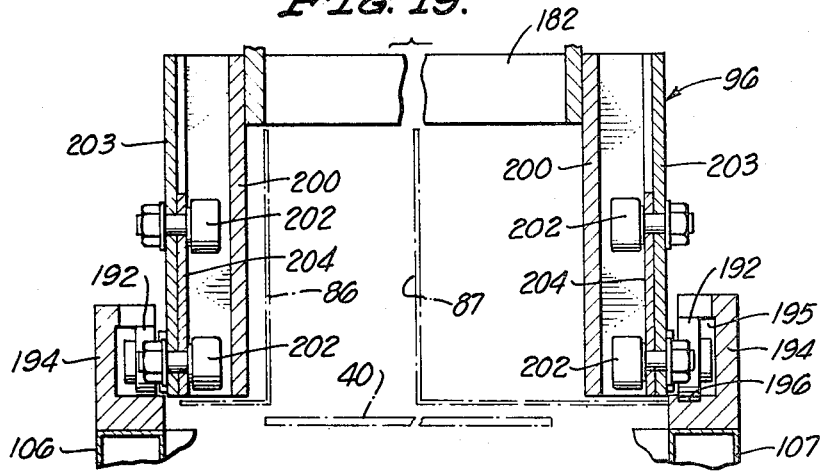
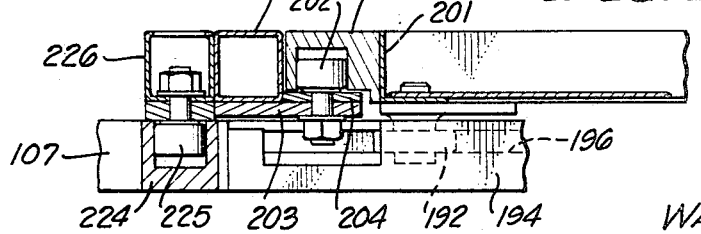

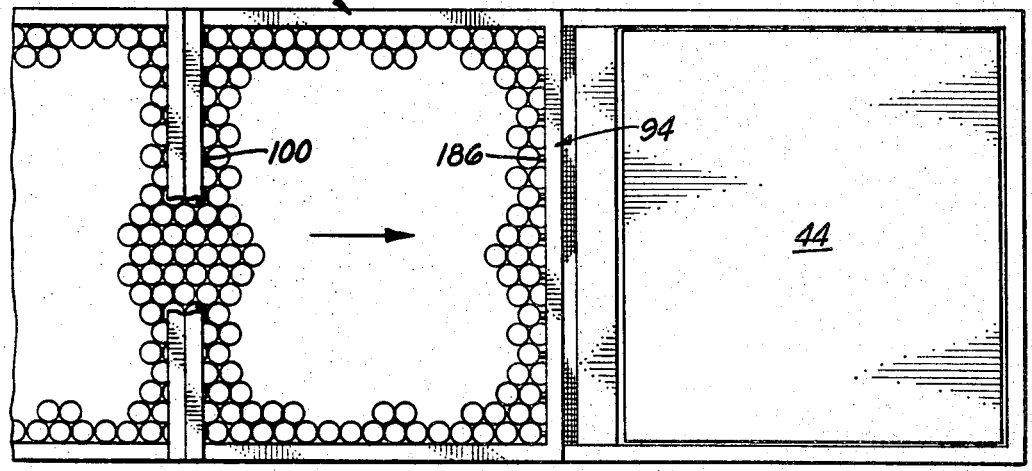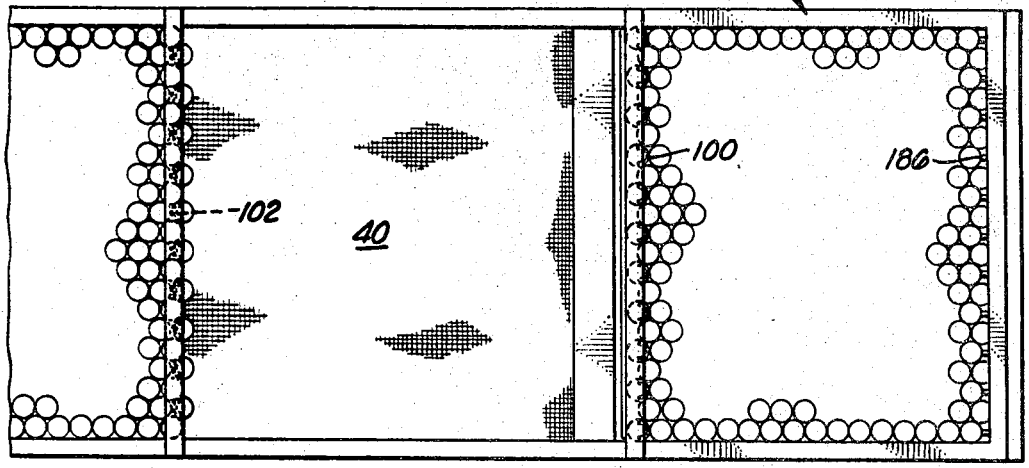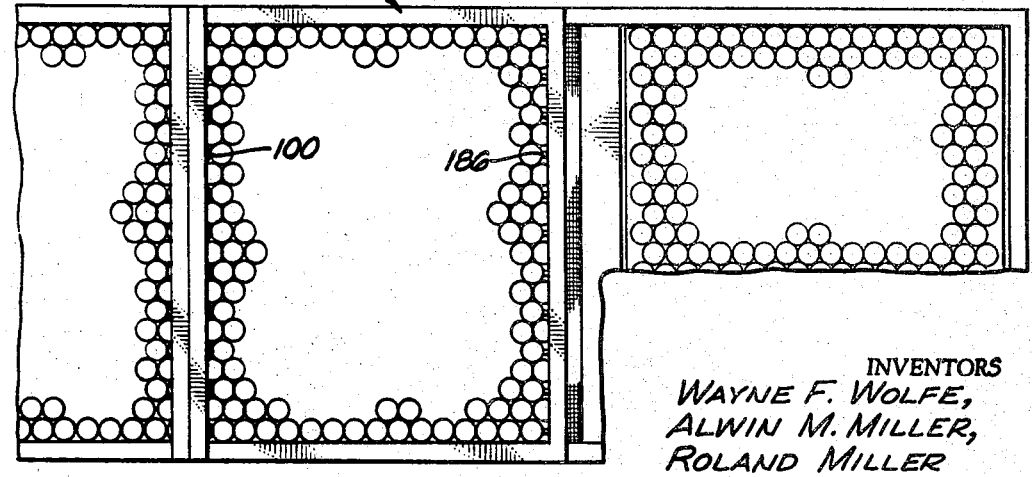

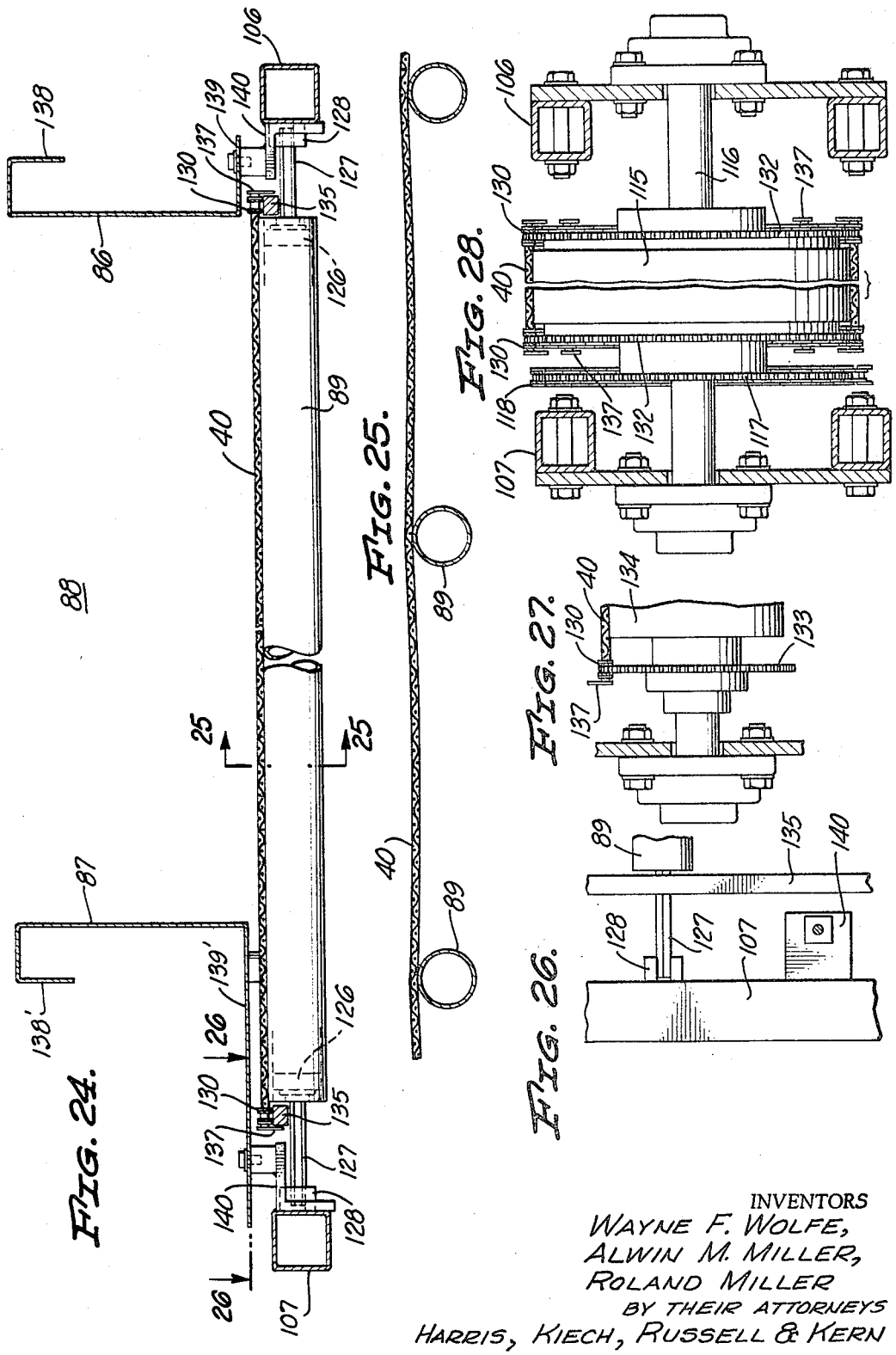

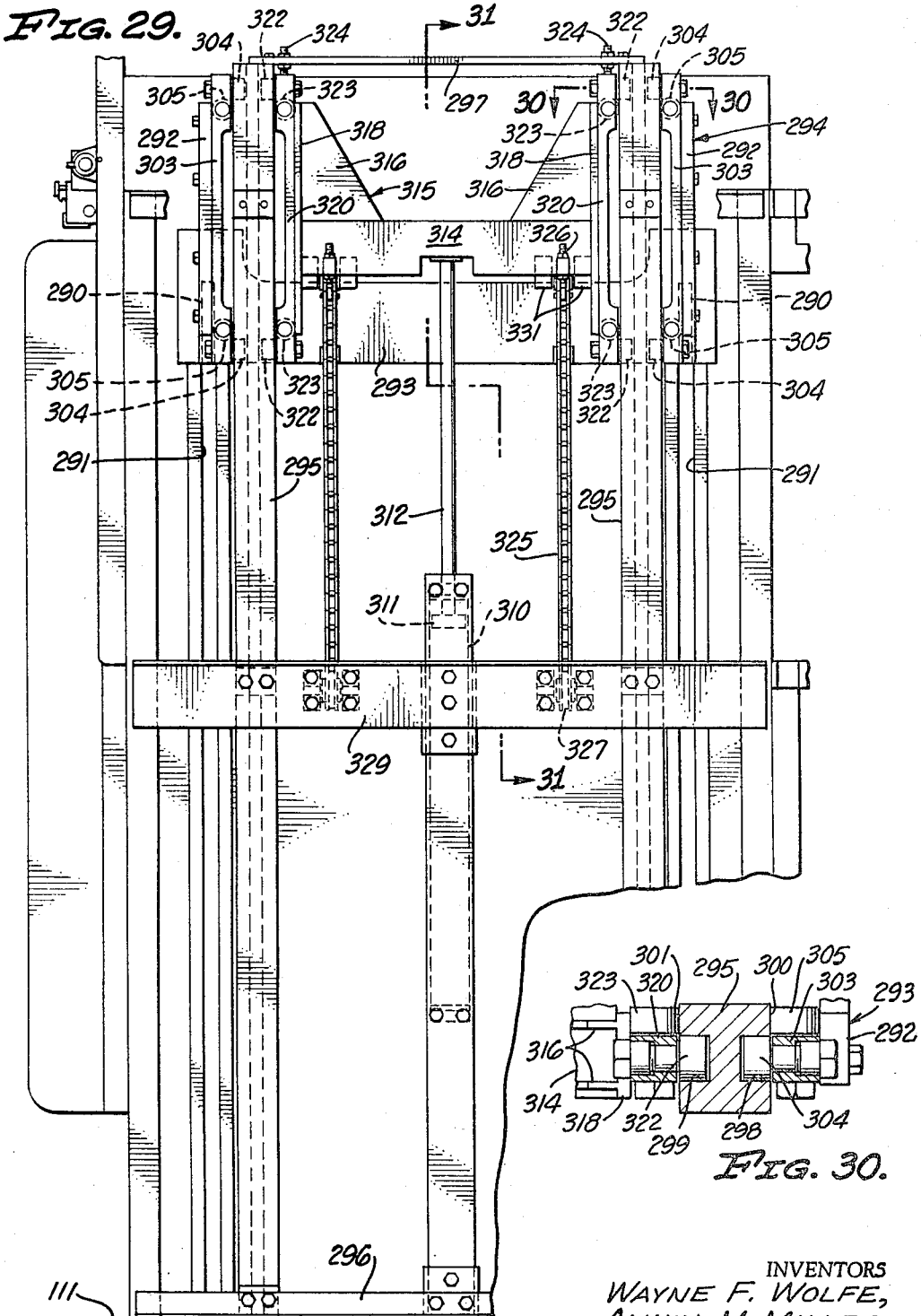

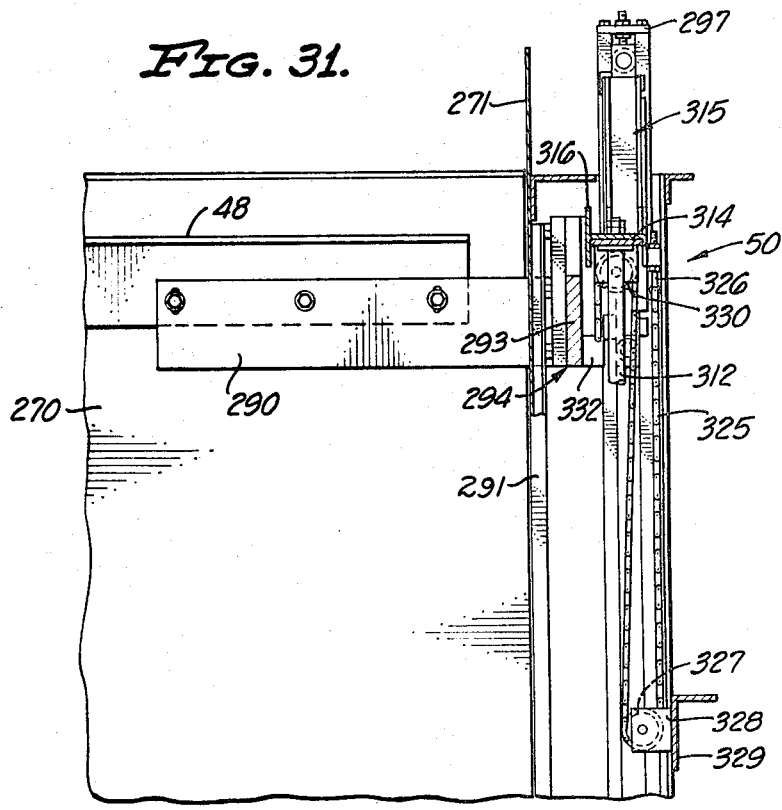
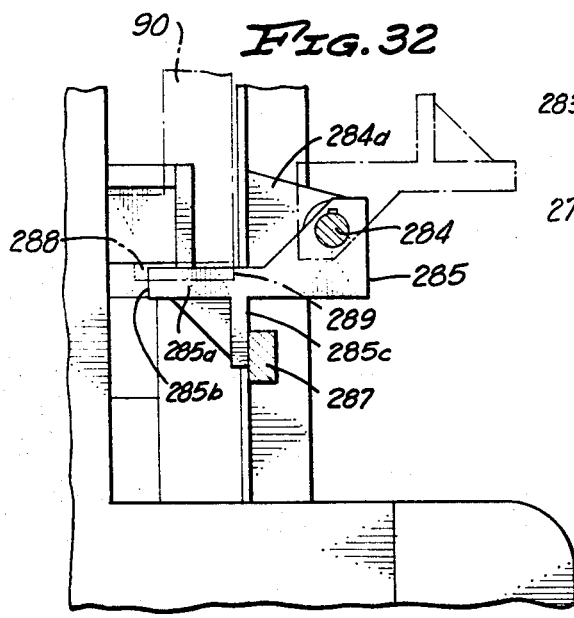
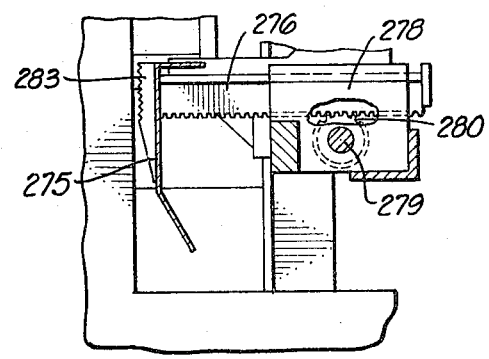

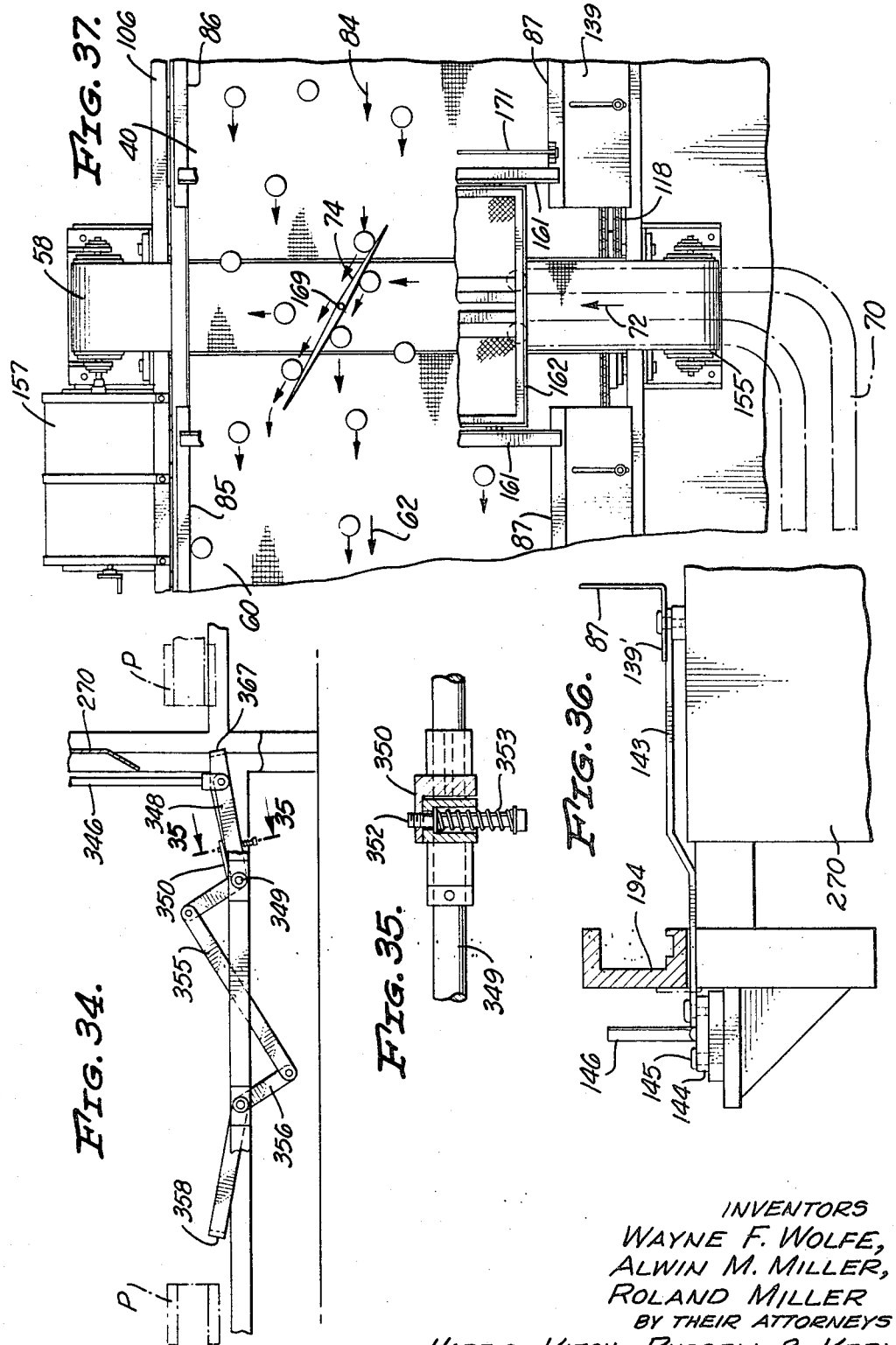

United States Patent Office 3,389,810
Patented June 25, 1968

3,389,810
PALLETIZING AND DEPALLETIZING EQUIPMENT
Wayne F. Wolfe, Orange, Alwin M. Miller, Fremont, and Roland Miller, Orange, Calif., assignors to Hunt Foods and Industries, Inc., Fullerton, Calif., a corporation of Delaware
Filed Oct. 23, 1964, Ser. No. 406,095
10 Claims. (Cl. 214—6)

Our invention relates to equipment for handling cans or the like and more particularly to equipment adapted to palletize and depalletize containers such as metal cans.

The canning of food or other products is most economically practiced if cans are fed from a can-supply source, such as a can-manufacturing plant or can-storage facility, to the cannery or can-use equipment at related rates, permitting filling of the cans as fast as they are produced or received. Unfortunately this condition cannot be maintained in practice because slow-downs or stoppages in one operation cannot be immediately matched in the other. It is an object of the present invention to provide, in effect, a variable reservoir of cans between can-supply and can-use operations.

In this connection it is an object of the invention to provide equipment that can palletize excess cans from can-supply equipment and depalletize same when later needed by the can-use equipment. Another object is to supply simultaneously to such can-use equipment some cans from the can-supply equipment and some cans from a depalletizing operation in the event the number of cans from the can-supply equipment is insufficient to meet the demand of the can-use equipment. A further object is to provide equipment that can be shifted from a palletizing to a depalletizing operation almost instantly and without extensive adjustments.

An object of the invention is to provide a deflector gate at a can-receptive station, this gate being adjustably mounted to deflect cans in various directions. For example, in one position the deflector gate may deflect cans from one or more can lines to the can-use equipment as a normal operation. In another position the deflector gate may deflect such cans to a conveyor as a part of a palletizing operation. In another position such a deflector gate may be adjusted to pass cans from the conveyor to the can-use equipment as a part of a depalletizing operation.

Another object is to dispose such a deflector gate above a transverse conveyor moving laterally of the main conveyor. In the preferred practice it is an object to provide such a transverse conveyor between spaced ends of two conveyors.

Cans to be palletized should be arranged in a nested pattern. It is an object of the invention to provide improved equipment receiving cans in a random pattern and forming these into a nested pattern. A further object is to perform this nesting while the cans are on a moving conveyor.

A further object of the invention is to divide the patterned cans into can-complements that are swept off a forwardly-moving conveyor onto a pallet and later, as a part of a depalletizing operation, swept off the pallet onto the same conveyor while moving in a reverse direction.

To perform these operations the invention preferably patterns the cans within and upstream of an open-bottom carriage that is movable from a first position above an end portion of a conveyor to a second position overlying or spanning a pallet zone. It is an object to provide such a movable carriage useful in palletizing, depalletizing or both. A further object is to provide such a carriage with a stop member near the forward end thereof movable from a position above the conveyor to a position adjacent the forward boundary of the pallet zone. A further object is to shape such a stop member in such manner as to stop and space advancing cans to form the front row of a pattern of nested cans.

The main conveyor of the invention provides other new features facilitating the transport and nesting of cans carried forward thereon in a random pattern. This conveyor extends between the can-receptive station and a pallet zone. The latter provides elevator means successively presenting pallets at the end of the main conveyor substantially at the level of the upper run thereof. It is an object of the invention to provide an elevator means that is uniquely constructed; preferably one that provides lift arms for the pallet that can move vertically the complete height of the stack of palleted cans while actuated by a hydraulic cylinder moving only a fraction of this distance. The structure adjacent the pallet zone provides other novel features of construction including in-line transports for empty and loaded pallets.

Other objects and advantages of the invention reside in constructional details and arrangements throughout the system and will be evident to those skilled in the art from the following description of an exemplary embodiment of the invention.

Referring to the drawings:

FIGS. 1 and 1a are diagrammatic plan and side views illustrating some of the main components of the complete equipment and suggesting the general mode of operation thereof;

FIG. 2 is a side elevational view of the equipment at the left-hand end of FIG. 1a adjacent the can-receptive station;

FIG. 3 is a fragmentary top view of a portion of the equipment shown in FIG. 2, being taken as indicated by the arrow 3 of FIG. 2;

FIG. 4 is a fragmentary sectional view taken along the line 4—4 of FIG. 3;

FIG. 5 is a side elevational view of the equipment at the right-hand end of FIG. 1a adjacent the pallet zone, FIG. 6 being a top view thereof;

FIG. 7 is a sectional view taken along the line 7—7 of FIG. 6 showing the can-holding means and the can-advancing means in their upper positions;

FIGS. 8 and 9 are fragmentary sectional views of the can-stop member of the carriage, taken along corresponding lines of FIG. 7;

FIG. 10 is a fragmentary sectional view of the can-holding and can-advancing means, being taken along the line 10—10 of FIG. 7;

FIGS. 11 and 12 are fragmentary views of the can-holding and can-advancing means, respectively, being taken along corresponding lines of FIG. 7;

FIG. 13 is a view similar to FIG. 7 showing the elements in different position with the can-advancing means moving away from the can-holding means;

FIG. 14 is a fragmentary view showing the control for the can-holding and can-advancing means taken along the corresponding line of FIG. 6, this view showing also some of the control wiring;

FIG. 15 is a fragmentary view taken as indicated by 15—15 of FIG. 6 and showing the can-holding and can-advancing means in their lower positions, FIG. 16 being a similar view showing these means in their upper positions and the retaining means for holding them in the latter positions;

FIG. 17 is a fragmentary sectional view of this retaining means, taken along the line 17—17 of FIG. 15;

FIGS. 18, 19 and 20 are sectional views taken along corresponding lines of FIG. 15;

FIGS. 21, 22 and 23 are sequence views illustrating the function of the carriage in pattern forming, sweeping a can-complement into the pallet zone and returning to a loading position;

FIGS. 24–28 illustrate details of the conveyer, FIG. 24 being a sectional view taken along the line 24—24 of FIG. 3, FIGS. 25 and 26 being taken along corresponding lines of FIG. 24 and FIGS. 27 and 28 being taken along corresponding lines of FIG. 2;

FIG. 29 is a rear elevational view of the elevator at the pallet zone, being taken in the direction of the arrow 29 of FIG. 6;

FIGS. 30 and 31 are fragmentary sectional views taken along corresponding lines of FIG. 29;

FIGS. 32 and 33 are fragmentary sectional views taken along corresponding lines of FIG. 6;

FIG. 34 is a fragmentary elevational view of the pallet stop for empty and loaded pallets, being taken as indicated by the arrow 34 of FIG. 6;

FIG. 35 is a fragmentary sectional view taken along corresponding lines of FIG. 34;

FIG. 36 is a fragmentary sectional view taken along the line 36—36 of FIG. 6; and FIG. 37 is a view similar to FIG. 3 showing the deflector gate in a position receiving both depalletized cans and cans from the can-supply equipment.

General description and operation

Referring to FIGS. 1 and 1a, which show diagrammatically many of the main features of the invention, the palletizer-depalletizer is shown as providing a main conveyor 40 extending between a can-receptive station 42 and a pallet zone 44 in which layers of nested cans C are positioned on a pallet 46 carried on arms 48 of an elevator 50. During palletizing, empty pallets can be advanced forwardly to the pallet zone 44 on an empty-pallet conveyor 52 beneath the main conveyor 40. Filled pallets advance forwardly to a wrapping area or storage on a conveyor 54. During depalletizing, all of such conveyors are operated in reversed direction, conveyor 54 delivering filled pallets to the pallet zone as needed and conveyor 52 moving empty pallets therefrom. A short reversible pallet conveyor 56 bridges the conveyors 52 and 54 with sufficient space therebetween for the arms 48. The conveyor 56 can be controlled to move the pallets in either direction in the pallet zone.

At the can-receptive station 42 the upper run of a transverse conveyor 58 bridges the space between the upper runs of the main conveyor 40 and an auxiliary conveyor 60. The latter is controlled to move in the direction of arrow 62 and delivers cans from the can-receptive station 42 to a can-transport system 64 which in turn delivers the cans to a cannery or other can-use equipment 66. Cans from a can-manufacturing plant or other can-supply equipment 68 move continuously through one or more can lines 70 to the upper run of the transverse conveyor 58. This conveyor moves in the direction of arrow 72 to bring cans against a deflector gate 74 where they are deflected and where all semblance of linear can arrangement is destroyed.

The deflector gate 74 is pivotally adjustable to assume any one of several positions. When in its full-line or palletizing position its front surface deflects incoming cans rightward onto the main conveyor 40, now moving forwardly in the palletizing direction of arrow 76. When its axis is in position 78 its front surface deflects incoming cans leftward onto the auxiliary conveyor 60 to the can-use equipment 66. This is the normal position of the deflector gate 74 when the rate of can supply is equal to the rate of can use. When the axis of the deflector gate 74 is in position 80 or between such position and its in-line position 82, i.e. in a depalletizing position, it passes to the can-use equpment 66 those previously-palletized cans moving rearwardly in the direction of arrow 84 on the now-reversed main conveyor 40. Some of such cans may be deflected toward a side-plate section 85 by the rear surface of the deflector gate 74 or by movement of the transverse conveyor 58 as concerns cans shifted thereto behind the gate from the main conveyor. Such movement of the transverse conveyor may also bring some cans, transferred to the forward portion thereof from the main conveyor 40, into contact with the front surface of the deflector gate 74. With the axis of the deflector gate 74 in or near the position 78 or 80 it is also possible to supply to the can-use equipment 66 some cans resulting from a depalletizing operation and some cans entering the can-receptive station 42 from the can-supply equipment 68, see FIG. 37.

The side-plate section 85 can be a part of a long side plate 86 traversing the combined length of the conveyors 40 and 60. An opposed adjustable side plate 87 is formed in sections respectively of the lengths of these conveyors, these sections being separated to provide space for cans supplied to the transverse conveyor 58. These side plates laterally confine a way 88. During a palletizing operation, open-topped cans in random arrangement are carried forward along the way 88 by the upper run of the main conveyor 40. Better results are obtained, including superior and jam-free patterning of the cans, if the upper run of the conveyor 40 is in a slight hill-and-dale pattern, suggested in FIGS. 1a and 25, as by supporting this upper run on spaced rollers 89 and permitting some sagging therebetween. The cans are thus jiggled or nudged relative to each other as they pass over the roller-formed hill portions of the pattern.

An open-bottom carriage 90 has a laterally-confined can-complement space 92 between a pattern-initiating stop member 94 at its forward end and a can-advancing or can-sweeping means 96 at its rear end. The latter is immediately forward of a can-holding means 98 separate from the carriage and movable up and down relative to the main frame of the machine. The stop member 94 and the can-sweeping means 96 are a part of and move forwardly and rearwardly with the carriage 90. The can-sweeping means 96 provides depending can-advancing fingers 100 and is mounted on the carriage to move between an upper position, in which the fingers 100 clear the tops of the cans on the conveyor 40, and a lower position, in which such fingers engage the cans in the rear row of a can complement of patterned cans in the can-complement space 92 of the carriage. Likewise the can-holding means 98 provides depending can-holding fingers 102 movable between an upper position, in which such fingers clear the tops of cans on the conveyor 40, and a lower position, in which such fingers engage the cans of that row of patterned cans immediately to the rear of the aforesaid rear row in the can-complement space.

The carriage 90 is movable from a first position (FIG. 1) in which its can-complement space 92 overlies and opens downwardly on an end portion of the upper run of the main conveyor 40, to a second position, in which the can-complement space overlies a pallet 46 in the pallet zone 44. This movement may be automatic but is usually accomplished manually.

In a palletizing operation, cans from the can lines 70 are deflected from the transverse conveyor 58 by the deflector gate 74 to be carried forward by the main conveyor 40, now moving in the direction of the arrow 76. With the carriage 90 in the position shown in FIG. 1 and with the can-sweeping and can-holding means 96 and 98 in their upper positions the leading cans of the initial flow advance to and are stopped by the stop member 94, which forms a patterned front row of cans as will be described. Rearward thereof the cans form a nested pattern filling the can-complement space 92 and extending in the way 88 several feet upstream from the can-holding means 98. Both the can-sweeping means 96 and the can-holding means 98 are then lowered so that fingers 100 and 102 respectively engage two rows of the patterned cans, the forward row representing the rear row of the can-complement in the space 92. The carriage is then moved forward to sweep the can complement onto a pallet 46 which has been lifted by the arms 48 to substantially the same level as the upper run of the conveyor 40. The forward movement of this conveyor aids in sweeping the cans onto the pallet. During this movement of the carriage the can-holding means 98 retains the upstream pattern.

The carriage 90 is then returned rearward to its position above the conveyor 40. As it reaches this position the can-sweeping means 96 and the can-holding means 98 are raised to their upper positions, permitting the patterned cans to flow into and refill the can-complement space 92. After a chip-board separator has been placed over the previously-palleted cans and the pallet lowered by the elevator 50 to dispose this separator substantially at the conveyor level the new can complement is swept onto the separator. In this way successive layers of patterned cans are built up on the pallet. The filled pallet is then moved to storage by operating the pallet conveyor 56 to transfer it to the filled-pallet conveyor 54, an empty pallet being then advanced by the conveyor 52 into the pallet zone and lifted for continuance of the palletizing operation.

In the depalletizing operation a filled pallet is reversely moved into the pallet zone by the conveyors 54, 56 and is lifted by the elevator 50 until the top layer of palleted cans is substantially opposite the upper run of the main conveyor 40. This is done while the carriage 90 overlies the pallet zone, preferably in a forward position slightly more advanced than its position during palletizing, to dispose the palleted cans in the can-complement space. With the main conveyor 40 moving in the depalletizing direction of the arrow 84 and with the can-sweeping means 96 and the can-holding means 98 locked in their upper positions the carriage 90 is moved leftward to sweep the layer of nested cans from the pallet onto the conveyor, the stop member 94 acting as a pusher. The carriage is then returned to the pallet zone after the chip-board separator has been removed from the next layer of cans. The elevator 50 then lifts the pallet to dispose the next layer of palleted cans in the can-complement space 92 preparatory to being swept onto the conveyor. In this way successive layers of palleted cans are swept onto the main conveyor 40 and moved rearward through the can-receptive station 42 to the can-use equipment 66 while the deflector gate 74 is in its depalletizing position.

*Framework and main conveyor*

The main conveyor 40 preferably extends throughout a major portion of the length of a main frame, designated as 105, having many sub-frames and elements some of which will be later designated specifically. In general the main frame includes upper longitudinal frame members 106 and 107 (FIGS. 3, 5, 6, and 24) shown as square tubular members, bridged by upper transverse frame members 108 (FIGS. 4 and 7) many of which are not shown. At a lower or platform level are longitudinal intermediate frame or sub-frame members 109 (FIGS. 2, 5) supporting a long platform 110 on which the operator stands. Portions of the platform are shown in FIGS. 3 and 6. Just above the floor 111 are lower frame or sub-frame members 112 (FIGS. 2 and 5) that are transversely connected and that are adapted to mount the pallet conveyors 52, 54 and 56. Various post members 113 (FIGS. 2, 5) support the horizontal frame members at designated levels.

The main conveyor 40 is preferably an endless metal-mesh conveyor many feet in length to provide a "cushion" or floating reservoir of cans between the can-supply and can-use equipment even aside from a palletizing operation. Its end loop adjacent the can-receptive station 42 surrounds a drum 115 (FIG. 28) mounted on a drive shaft 116 to which is also connected a drive sprocket 117. The latter is driven by a chain 118 from a variable-speed reversible, main-conveyor motor 120 (FIG. 2) controlled remotely by one or more control buttons or switches 121 on one of two control panels 102 and 123 (FIG. 5) near the pallet zone. The end loop near the pallet zone encircles an idler drum 125 (FIG. 7).

The top run of the main conveyor is supported at spaced intervals by the rollers 89 each of which may be tubular with bearings 126 therein (FIG. 24) to journal it on a multi-sided shaft 127 having its ends resting nonrotatably in upwardly-open U-shaped slots in support members 128 attached to the upper frame members 106 and 107.

The mesh portion of the main conveyor preferably extends between supporting or drive chains 130 (FIGS. 2, 3, 6, and 24) being connected thereto at short intervals. The mesh portion of the auxiliary conveyor 60 may be bounded by similar chains 131 one of which is shown in FIG. 3. The drive chains 130 extend over sprockets 132 fixed to the ends of the drum 115 (FIG. 28) and over corresponding sprockets on the idler drum 125 near the pallet zone. At positions therebetween the lower run of the main conveyor is supported by similar sprockets 133 associated with idler drums 134 (FIG. 27).

The upper run of the main conveyor can be supported exclusively by the rollers 89 but the resulting hill-and-dale pattern is sometimes undesirably severe. In this instance we employ chain rails 135 (FIG. 24) outwardly of the ends of the rolls 89 below the drive chains 130. The upper surfaces of these chain rails are preferably below a horizontal plane common to the upper peripheries of the rolls 89 so that the upper run of the conveyor is lifted at each roll to form the hills of the hill-and-dale pattern. In a central section between any pair of rolls 89 the drive chains may rest upon and slide on the upper surfaces of the chain rails so as to determine the maximum degree of dip in the dale portions of the pattern. Guide elements 137 (FIGS. 24, 27) secured at intervals to the outer sides of the drive chains 130 extend below such upper surfaces of the chain rails 135 to guide and laterally stabilize the upper run against shifting as it advances in either direction.

The side plate 86 defining one side of the way 88 is preferably shaped as in FIG. 24. Its upper side is deformed to provide a return bend 138 for rigidity. Its lower portion is bent to form a shelf 139 attached by spaced brackets 140 to the upper longitudinal frame member 106. In somewhat similar manner the adjustable side plate 87 is bent to provide a return bend 138' and a somewhat longer shelf 139' connected by brackets 140 to the longitudinal frame member 107. The latter connection is preferably adjustable to provide adjustment for the width of the way 88. In this connection the shelf 139' provides slots 141 (FIG. 3) with bolts 142 extending therethrough into the upright portion of a corresponding bracket 140.

The extreme forward portion of the side plate 87 is minutely adjustable by the operator through the mechanism shown in FIGS. 6 and 36. This includes a link 143 interconnecting the forward end of the shelf 139' and a rotary link 144 pivoting at 145 as a handle 146 is turned. The upper flange and the return 138, 138' are removed from the side plates 86 and 87 in the vicinity of carriage movement but the upright walls of these side plates remain and serve as the outer boundaries of the can-complement space 92 of the carriage 90. The spacing of these side walls is accurately adjustable by movement of the handle 146.

*Structure at can-receptive station*

The auxiliary conveyor 60 adjacent the can-receptive station is preferably a short metal-mesh conveyor similar to the main conveyor 40. It extends around an idler roll 147 (FIG. 2) having thereon a sprocket for the aforesaid drive chain 131. It extends also around a drive roll 148 driven through a chain 149 by a variable-speed auxiliary-conveyor-drive motor 150. The controls for this motor may be on one of the control panels 122, 123 or on a separate control panel 151 near the can-receptive station.

Cans moving leftward on the auxiliary conveyor 60 tip from an upright position to a horizontal position as they move from the left end of the auxiliary conveyor, see FIG. 2. These cans drop on sloping belts 153 of the can-transport system 64, being delivered therefrom to conventional can-conveyor means extending to the can-use equipment 66. The details of the can-transport system 64 are not a part of the present invention and are only diagrammatically illustrated as any one of a number of known can-transport systems can be employed receiving cans directly from the auxiliary conveyor 60 or after they fall therefrom.

The transverse conveyor 58 is best shown in FIGS. 2, 3, and 4. It may be a metal-mesh or other conveyor belt extending around a drive roll 154 and an upper idler roll 155, determining the upper run thereof, and one or more lower idler rolls 156 determining the lower run thereof. The drive roll 154 is driven by a motor 157 the speed of which can be controlled by a handle 158. The upper run of the transverse conveyor 58 slides on a leveling plate 159 (FIG. 4) secured to the upper transverse frame members 108. The sides of the conveyor belt and the sides of the leveling plate are disposed in guide channels of two support members 160.

Above the transverse conveyor 58 at the can-receptive station are transverse frame members 161 (FIG. 3) supporting a frame 162 with its opening substantially completely closed by a foraminous plate or a screen 163. The vertical distance between this screen and the top run of the auxiliary conveyor 60 is only slightly higher than the can height, providing a can space through which cans may be carried by the conveyor or thereacross. The height of the can space is such as to prevent tipping of the cans moving therein.

Offset members 164 (FIGS. 3 and 4) secured to the frame 162 are spaced from each other to define a channel 166 through the screen 163. A rigid arm 167 is adjustably bolted to the offset members 164 and extends to the right beneath the corresponding transverse frame member 161 (FIG. 3). Pivoted in a sleeve 168 welded to the arm 167 is a shaft 169 to the lower end of which is connected the deflector gate 74. This deflector gate is thus centrally pivoted and provides aligned wing portions which are preferably slightly tapered as suggested in FIGS. 3 and 37.

The deflector gate 74 is preferably adjustable by the operator standing near the control panels 122 and 123. As shown, the upper end of the shaft 169 mounts a cross bar 170 to the ends of which are connected control wires 171 which run over a number of guide rollers 172 to an adjustment member 174 (FIG. 5) adjacent the control panel 122. This adjustment member is pivoted at 175 and forms in effect a cross bar similar to the cross bar 170 of the deflector gate. The adjustment member 174 carries a handle 176 (FIGS. 5 and 6) aligned with a lock means which extends through an arcuate groove 177 of a mounting plate 178. This permits the adjustment member 174 to be turned and locked in various positions, imparting proportional angular movement to the deflector gate 74 and thus positioning the latter in any one of its aforesaid positions.

*Carriage and pattern forming*

The carriage 90 is constructed of horizontally paired upper side angles 179 and lower side angles 179a (FIG. 7) interconnected by vertical side plates 180 and 180a. The upper angles 179 are interconnected and spaced by front and rear channel members 181 and 182. These channel members are above the tops of the side plates 86 and 87 and the angles 179 and 179a are outwardly thereof. The junctions of the upper angles 179 and the front and rear channels 181 and 182 are braced by gussets 183 (FIGS. 6 and 7). The rear ends of the opposed lower angles 179a are not interconnected so that the can-complement space 92 is open rearwardly toward the advancing cans to be palletized and open downwardly on the upper run of the main conveyor 40.

The forward end of the can-complement space is blocked by a stop member 94 comprising a lower laterally-extending bar 185 (FIGS. 7-9) welded to upright posts or bar-like projections 186 facing the cans advancing in a palletizing operation. The projections 186 are spaced to form can-stalls or can-receptive spaces 187 of a transverse width greater than the can width, these spaces receiving the forward or crest portions of advancing cans to initiate the pattern, as will be later described. The upper ends of the bar-like projections 186 are secured to an angle iron 188 in similarly spaced relation, the angle iron being connected by adjustable brackets 189 and 190 to the front channel 181. The space between the bar 185 and the angle iron 188 provides a space receptive of the lips of the cans, see FIG. 7.

The carriage 90 slides along a suitable track means during its movement between the aforesaid first and second positions respectively above the end of the main conveyor 40 and the pallet zone 44. In the preferred arrangement each of the lower side angles 179a carries outwardly thereof rollers 192 respectively at the front and rear ends of the carriage. The resulting four rollers roll along opposed channel-like tracks 194 (FIG. 19) in way spaces 195 thereof. The track structures 194 are attached to the upper ends of the upper longitudinal frame members 106, 107 and extend therebeyond across the pallet zone 44, see FIG. 5. The bottom wall of the way space 195 on one side of the carriage is channeled to form a depressed roller-receiving track 196 providing lateral stability for the carriage.

The invention provides means for moving the carriage 90 to and fro between its first and second positions. This means can be automatic but is shown as including a handle 198 projected upward from the carriage (FIGS. 5 and 6). The extreme forward and rearward positions of the carriage are determined by stop means to be later described.

The can-sweeping means 96, carried by the rear of the carriage 90, is best shown in FIGS. 7, 11, 13, 15, 16, 19, and 20. This means is mounted to move vertically relative to two upright track-forming members 200 (FIG. 20) welded to angles 201 at the rear of the carriage. The track-forming members 200 are outwardly channeled to receive and guide vertically paired rollers 202 each pair being mounted in a plate 203 carrying a spacer 204. The plates 203 are respectively welded to upright tubular legs 205 interconnected at their upper ends by a tubular cross member 206 (FIGS. 7 and 13) to form a frame of inverted-U shape that can move vertically relative to the carriage 90 yet which is carried forwardly and rearwardly therewith during its fore and aft movement. An angle 206a is adjustably bolted to the forward face of the tubular cross member 206 and forms therewith the transverse member 207 of the can-sweeping means 96.

The can-advancing fingers 100 depend from the transverse member 207. They are spaced laterally a center-to-center distance equal to the spacing of the bar-like projections 186 and aligned therewith in a fore-and-aft direction. The fingers 100 are preferably formed to provide broad forwardly-facing crests 209 of a radius only slightly smaller than the internal radius of the cans. As shown in FIGS. 7, 10 and 11 the fingers are semitubular elements with their side edges 211 converging downward and with beveled lower ends 212.

Means is provided for locking the can-sweeping means 96 in its upper or can-clearing position during depalletizing or during the initial carriage-loading interval of the palletizing operation. This means is best shown in FIGS. 6 and 15–17. A transverse rod 214 is journalled in plates 215 attached to the rear portion of the carriage at its sides. Attached to this rod outward of each plate 215 is a latch member 217 having a latch finger 218. That latch member on the front or operator's side of the equipment provides also a handle extension carrying a latch operating handle 219. The outer portion of this handle can be pulled outward relative to its base portion to release and lock the handle extension in one of two positions. As shown in FIG. 17 such outer portion carries a headed pin 220 surrounded by a compression spring 221 in a socket of the base portion, permitting the head of the pin 220 to be withdrawn into the socket. When the head is in its extended or locking position it enters one of two holes 222 in the corresponding plate 215, locking the latch member in one of two positions. When in the full-line position of FIG. 15 the latch fingers 218 clear the tubular cross member 206, permitting the can-sweeping means 96 to move up and down between an upper position, in which the fingers 100 clear the cans, to a lower position, in which these fingers enter a transverse row of nested cans. When in the full-line position of FIG. 16 the latch fingers 218 are shifted through holes in the angle 206a to a position beneath the tubular cross member 206 and hold it and the can-sweeping means 96 in the upper or clear position.

The can-holding means 98 is mounted to move up and down in two track-forming members 224 attached to the longitudinal frame members 106 and 107 (FIGS. 18 and 20). The members 224 are inwardly channeled to receive and guide vertically paired rollers 225 which are a part of a frame of the can-holding means 98. This frame is of inverted-U shape and includes upright tubular legs 226 connected at their upper ends by a tubular cross member 227 (FIGS. 7, 13, and 18). The latter along with an angle 227a forms a transverse member 229 of the can-holding means 98.

The can-holding fingers 102 depend from the angle 227a of this transverse member 229 as best shown in FIGS. 7, 12, and 13. These fingers may be of the same construction as described concerning the can-advancing fingers 100 but are crested rearwardly to enter those cans of a transverse row immediately to the rear of the row engaged by the can-advancing fingers 100. The fingers 102 are laterally offset from the fingers 100 but are spaced a center-to-center distance equal to the spacing of the latter. The can-holding fingers 102 may provide broad rearwardly-facing crests 230 of a radius only slightly smaller than the internal radius of the cans, being semitubular elements with their side edges 231 converging downward to beveled lower ends 232.

The can-holding means 98 is movable between an upper position, in which the fingers 102 clear the cans (FIG. 7), to a lower position in which the fingers enter the cans of a transverse row and hold these against advancement by the conveyor (FIG. 13). This up-and-down movement is effected by means best shown in FIGS. 15 and 16 as including one or two air cylinders 235 with their lower ends pivotally connected to frame brackets 236. Each cylinder has a piston 237 connected to a lever 238 attached to a transverse rod 239 that is journaled in frame brackets 240. The forward ends of the levers 238 provide elongated openings receiving rollers 241 attached by brackets 242 to the upper portion of the inverted U-shaped frame (FIG. 18). Up-and-down movement of the pistons 237 thus results in amplified up-and-down movement of the can-holding means 98.

When the carriage 90 is in its first or rear position the inverted-U frames of the can-sweeping means 96 and the can-holding means 98 are adjoining (FIGS. 7, 15, 16, and 20), contact between these frames acting as a stop to determine the rearmost position of the carriage. The invention includes means for locking together the transverse members 207 and 229 of these frames for simultaneous up-and-down movement when these members are adjoining but permitting separation thereof when they are lowered so as to permit the can-sweeping means 96 to move forward with the carriage. This locking means includes interengaging means releasing the transverse member 207 from the transverse member 229 while still permitting lifting of the former by the latter. Such interengaging means may include a lift bar 243 (FIGS. 7 and 13) secured to the tubular cross member 206 and extending rearwardly thereof to overlie the tubular member 227 when these members are adjoining as in FIG. 7. When the air cylinders 235 lift the can-holding means 98 the can-sweeping means 96 will likewise be lifted. A detent-type interengagement is preferable and can be produced by welding a bead 244 across the top of the tubular transverse member 227 to slip into a groove 245 of the lift bar 243 with a detent action.

Controls are provided within reach of the operator permitting either manual or automatic supply of air to the air cylinders 235 to lift the can-sweeping means 96 and the can-holding means 98 when the carriage returns to its rear or first position. Automatic means of this type is diagrammatically shown in FIG. 14. Referring thereto an actuator 250 is welded to a lower portion of the carriage frame to engage an actuating arm 251 of a switch 252 mounted on an adjustable bracket 253 attached to the main frame of the machine. This switch is connected serially with a solenoid-operated valve 256 which controls the flow of air to and from the air cylinders 235. A normally-closed switch 257 at one of the control stations 122, 123 is also in the control circuit of the valve. During automatic operation the actuator 250 engages and swings the actuating arm 251 of the switch 252 in the direction of the full-line arrow an instant before the carriage returns to its first position. This opens the valve 256 and raises both the can-sweeping means 96 and the can-holding means 98, permitting a new complement of patterned cans to be advanced by the conveyor into the can-complement space of the carriage. Thereafter air is bled from the air cylinders 235 by manual opening of the switch 257. This switch is retained open until after the actuator 250 has opened the switch 252 by swinging its actuating arm 251 in the direction of the dotted arrow during forward movement of the carriage. As a substitute for automatic operation, manual control of inflow and outflow of air to the air cylinders 235 can be effected through a solenoid actuated valve 258 controlled by a switch 259 on one of the control panels 122, 123.

*Pattern forming*

At the start of a palletizing operation cans advancing along the main conveyor moving in the direction of the arrow 76 are in random pattern and advance beneath the now-raised can-holding means 98 and the can-sweeping means 96. The leading cans are stopped by the lower bar 185 of the stop member 94 and enter the can-receptive spaces to form a front row of rather widely spaced cans. The succeeding cans crowd thereagainst to form the nested pattern. In this pattern the front and alternate rows contain one less can than the second or intervening rows. The width or forward projection of the bar-like projections 186 may be such that the crests thereof engage the cans of the second row, as in FIGS. 8 and 21, but this is not essential to the pattern forming as the projections 186 serve primarily to space the first row of cans in the can-receptive spaces 187, these spaces being substantially wider than the cans. The cans continue to form a nested pattern in the way 88, filling the can-complement space 92 of the carriage and a portion of the way 88 upstream thereof. The resulting pattern is shown in FIG. 21. It will be observed that the side rows engaging the side plates 86 and 87 are straight rows of engaging cans while the composite of the front row and the next-rearward row is a staggered row.

When the nested pattern has built up several feet upstream of the carriage 90 the can-holding means 98 and the can-sweeping means 96 are simultaneously lowered. The can-holding fingers 102 then hold the upstream can pattern while the can-advancing fingers 100 aid in sweeping from the conveyor 40 onto the pallet 46 the can complement of the carriage. This position of the can complement and the carriage is shown in FIG. 22.

The empty carriage is then returned to its first position whereupon the switch 252 is actuated to lift automatically both the can-sweeping means 96 and the can-holding means 98, permitting the patterned cans to be moved by the conveyor into the can-complement space of the carriage, forming a new can complement therein (FIG. 23) which can then be swept into the pallet zone after a chipboard separator has been placed on the previously-palleted complement and the elevator has been lowered to dispose the separator substantially opposite but slightly below the upper run of the main conveyor 40.

*Pallet zone and elevator*

The structure of the equipment adjacent the pallet zone is best shown in FIGS. 5, 6, and 29–33. The pallet zone 44 is framed by the longitudinal frame members 106, 107 and by other frame elements. Its rear end is open at its top to the way 88 but closed therebelow by a rear guide plate 270 (FIG. 5) bent outward at its bottom to guide and facilitate the rise of empty pallets. Its sides are bounded by upright guide plates 271 and 272 (FIG. 6) generally aligned with the side plates 86 and 87, the guide plate 272 being made adjustable similar to the side plate 87. The forward ends of the upright guide plates are bent outward to guide and facilitate entry of filled pallets from the full-pallet storage during depalletizing.

The forward end of the pallet zone is essentially open to the full-pallet zone, shown rightward thereof in FIGS. 1, 5 and 6. However it is bounded at its upper end by an adjustable stop plate 275 (FIGS. 5 and 33) carried by end members of the frame. To permit adjustment the stop plate 275 is mounted on rack-gear members 276 slidable horizontally in guide passages of a member 278 carried by the frame. A shaft 279 carries gears 280 meshing with the rack-gear members 276. A crank 281 (FIG. 5) carried by the shaft 279 and indexed to a disk 282 adjusts the position of the stop plate 275 and permits it to be displaced to an inner position closer to the conveyor 40 during palletizing to act as a stop and anchor for press-board separators S which may be stacked for use in a rack shown at the right end of FIG. 5. During depalletizing it is desirable that the stop plate 275 be moved to an outer position further away from the conveyor 40 to provide a larger space into which the top layer of palletized cans may be raised. The lower portion of the stop plate 275 is bent as in FIGS. 5 and 33 to guide and facilitate entry of such top layer of palletized cans. That face of the stop plate 275 facing the conveyor 40 preferably provides two serrated members 283 attached thereto in spaced relation. These serrations anchor and prevent rising of the forward edge of the chipboard separator covering one layer of cans when the next layer is fed on the separator during palletizing.

It is likewise desirable to stop the forward motion of the carriage 90 at different positions during palletizing and depalletizing. This is accomplished by a two-position stop means best shown in FIGS. 5, 6, and 32. Referring to FIGS. 6 and 32 a long transverse shaft 284 is journalled in frame-attached members 284a near the extreme forward end of the pallet zone. Mounted on this shaft in the path of forward movement of the carriage are two stop members 285 shaped as in FIG. 32 and shiftable by a handle 286 to assume either the full-line palletizing position or the dotted-line depalletizing position. Each stop member 285 provides a stop arm 285a having an end stop surface 285b; also a locating arm 285c that engages a fixed bar 287 when the stop member is in its full-line or palletizing position. The forward end of the carriage 90 carries at its sides depending blocks 288 (FIGS. 7 and 32). When the stop members 285 are in the full-line or palletizing position of FIG. 32 forward motion of the carriage is stopped when the front surface 289 of the blocks 288 reach and engage the stop surfaces 285b of the stop members. When the stop members 285 are swung upward and outward to the dotted-line positions the stop arm 285a and the locating arm 285c are removed from the zone of carriage movement, permitting the carriage to advance further to its dotted-line position of FIG. 32 where its front surface engages an auxiliary stop which may constitute any portion of the frame.

The elevator 50 provides two connector arms 290 adjustably bolted to the pallet-lifting arms 48. These connector arms 290 move up and down in corresponding slots 291 of the rear upright guide plate 271. The connector arms are respectively parts of side plates 292 that are interconnected by a massive longitudinal plate 293 as a part of a lift carriage 294 guided for up-and-down movement. This guiding function is performed by two massive guide bars 295 bolted at their lower ends to a frame member 296 and bridged at their upper ends by a frame member 297. Each guide bar 295 is H-shaped in cross section (FIG. 30) to provide an outer guide channel 298 and an inner guide channel 299 as well as flat outer and inner guide faces 300 and 301. A roller-supporting member 303 is bolted to each plate 292. Each roller-supporting member carries rollers 304 at its upper and lower ends extending in and guided by the outer guide channel 298. Likewise each roller-supporting member carries at its upper and lower ends rollers 305 that roll along the outer guide face 300.

The lift carriage 294 must be able to lift a pallet substantially the entire height of the pallet zone. It is desirable that this movement be effected by a hydraulic ram 310 having a piston 311 and ram-rod 312 capable of moving a much lesser distance. By the arrangement now to be described the motion of the ram-rod 312 is amplified to move the lift carriage 294 at a double rate and through a double distance.

The top of the ram-rod 312 is disposed in a bottom notch of a saddle member 314 of a hoist carriage 315. Four gusset members 316, arranged in parallel pairs connect the saddle member 314 to two plates 318 respectively carrying roller-supported members 320. Carried by the upper and lower ends of each roller-supporting member 320 are rollers 322 extending in and guided by the inner guide channel 299 of the corresponding guide bar 295. Likewise at the upper and lower ends of each roller-supporting member 320 are guide rollers 323 which roll along the inner guide face 301 of the corresponding guide bar 295. The hoist carriage 315 and the lift carriage 294 are thus guided by the same guide bars 295, the hoist carriage being guided in effect by inner surfaces thereof and the lift carriage by outer surfaces thereof. The uppermost position of the hoist carriage 315 is determined by adjustable stop bolts 324 through the frame member 297.

To drive the lift carriage 294 at double the speed and distance of the hoist carriage 315 we employ a block-and-tackle arrangement shown in FIGS. 29 and 31. This includes two chains 325 each having one end adjustably connected to the saddle member 314 of the hoist carriage 315 by an adjustable eye-bolt 326. Each chain loops downward and upward around a roller 327 journalled in a bifurcated bracket 328 held in fixed position as by being mounted on a frame member 329. From this point the chain 325 extends upwardly and downwardly over a sprocket 330 rotatable in blocks 331 (FIG. 29) that are fixed to the saddle member 314. The end of the chain is fixed to the longitudinal plate 293 of the lift carriage through use of a connecting block 332. By this arrangement a one-inch movement of the ram-rod 312 will result in a two-inch movement of the lift carriage 294 and the arms 48 carried thereby. The ram-rod 312 is minutely movable by any conventional pump or valve arrangement supplying or controlling liquid thereto and therefrom as determined by the movement of control handles 333 and 334 (FIGS. 5 and 6) easily accessible to the operator.

Pallet conveyors

An empty-pallet conveyor 52 extends the complete length of the machine to an empty pallet station 340 (FIG. 2). It desirably extends beneath the main conveyor 40 and provides at least one idler roll 341 (FIG. 2) and at least one drive sprocket 343 (FIG. 5) driven by a motor 344 that is remotely controlled from one of the control panels 122, 123.

A foot-operated control is employed to provide a stop for the pallets both during a palletizing operation and a depalletizing operation. This foot-operated control is best shown in FIGS. 5, 34 and 35. It includes a foot-operated head 345 at the top of a rod 346 biased upwardly by a spring 347. The lower end of this rod 346 is connected to a first stop member 348 having one of its ends pivoted at 349. An overmovement resilient connection is provided between the stop member 348 and the shorter arm 350 of a bell crank. This includes a bolt 352 threaded through an overlying portion of the shorter arm 350 surrounded by a compression spring 353 which bears upward against the first stop member 348. The longer arm of the bell crank is connected by a link 355 to a second bell crank 356 the longer arm of which terminates in a stop member 358 in the path of pallets P advancing rightward along the empty-pallet conveyor 52. This stops the advancing pallets even though the conveyor should continue to operate. When it is desired to release an empty pallet for movement into the pallet zone the operator steps on the foot-operated head 345 which lowers the stop member 358 from the path of the foremost empty conveyor and permits it to be advanced by the empty-pallet conveyor onto the pallet conveyor 56. As soon as pressure is removed from the foot-operated head 345 the stop member 358 returns to its upper position to stop the next pallet.

The pallet conveyor 56 is driven by a reversible electric motor 360 controlled from one of the control panels 122, 123. A chain 361 advances the conveyor 56 in either direction. A chain drive 362 bridges the space between the adjacent ends of the pallet conveyor 56 and the filled-pallet conveyor 54 to drive the latter. This latter conveyor is a short conveyor which can shift loaded pallets onto or receive pallets from a roller-type conveyor 365 extending to the full-pallet storage area.

When filled pallets are moved leftward from the roller conveyor 365 onto the reverse-driven filled-pallet conveyor 54 they are moved leftward therealong onto the reversely-driven pallet conveyor 56. Their leftward movement is stopped by a stop member 367 at the end of the first stop member 348 when in its normal raised position. The arms 48 are at this time below the pallet so that the elevator 50 can be controlled to lift the pallet until its top layer of cans is opposite the upper run of the main conveyor 40 after which the carriage can sweep the upper can layer onto this conveyor and the entire stack can be depalletized as previously described.

Various changes and modifications in the described equipment will be apparent to those skilled in the art and are within the scope of the appended claims.

We claim:

1. Can-palletizing equipment for palletizing uniform-size cans carried forwardly in a random pattern by a conveyor in a laterally-confined way above the upper run thereof toward a pallet in a pallet zone at the forward end of said conveyor, said can-palletizing equipment including:

a carriage having a can-complement space axially aligned with the forward end of said conveyor, said can-complement space being open rearwardly at its rear end toward the cans advancing along said way and closed laterally by side members and forwardly at its front end by a stop member disposed in the path of said advancing cans, said carriage providing means including said stop member for forming the cans advancing in random pattern by said conveyor into a nested pattern of cans filling said can-complement space and extending upstream thereof rearwardly beyond said rear end of said carriage;

means for mounting said carriage to move forwardly and rearwardly in the direction of movement of said conveyor between a first pattern-forming position in which said can-complement space overlies and opens downwardly on said upper run of said conveyor with said stop member thereabove near the end thereof and a second position in which said can-complement space overlies said pallet with said stop member adjacent the forward boundary of said pallet zone;

means for delivering cans in such random pattern to said conveyor while said carriage is in said first position, said stop member stopping the advance of said cans and forming the front row of said nested pattern; and a can-holding means adjacent the rear end of said carriage when in said first position holding against advancement by said conveyor those cans of said nested pattern upstream of said filled can-complement space, movement of said carriage to said second position in conjunction with forward movement of said conveyor effecting displacement of said nested pattern of cans in said can-complement space onto said pallet during the time said can-holding means holds such upstream nested-pattern cans.

2. Can-palletizing equipment as defined in claim 1 in which said can-holding means includes a first transverse member above said conveyor having depending can-holding fingers spaced to engage that row of patterned cans immediately back of the rear row of patterned cans in said can-complement space; means for mounting said first transverse member for movement between an upper position in which its fingers clear the cans advancing along said conveyor to a lower position in which such fingers engage said first-named row of patterned cans; and means for moving said first transverse member to its upper position during filling of said can-complement space and to its lower position preparatory to movement of said carriage to its second position.

3. Can-palletizing equipment as defined in claim 1 in which said can-holding means includes a first transverse member above said conveyor having depending can-holding fingers spaced to engage that row of patterned cans immediately back of the rear row of patterned cans in said can-complement space; means for mounting said first transverse member for movement between an upper position in which its fingers clear the cans advancing along said conveyor and a lower position in which such fingers engage said first-named row of patterned cans; a can-sweeping mans including a second transverse member forwardly adjacent said first transverse member having depending can-advancing fingers spaced to engage said rear row of paterned cans in said can-complement space; means for attaching said second transverse members to said carriage at the rear end thereof for movement between an upper position in which said can-advancing fingers clear the cans advancing along said conveyor and a lower position in which such fingers engage the cans of said rear row; and actuating means for said transverse members including means for lowering both of said transverse members to their lower positions preparatory to movement of said carriage from its first position to its second position and for lifting both of said transverse members upon return of the empty carriage to its first position from its second position.

4. Can-palletizing equipment as defined in claim 3 in which said actuating means includes drive means operatively connected to one of said transverse members to move same between its upper and lower positions, and means locking said transverse members together for simultaneous up and down movement when said transverse members are adjacent each other, said locking means including interengaging means for releasing said second transverse member from said first transverse member upon forward member-separating movement of said carriage from its first position toward its second position and for reengaging said transverse members upon return of said carriage to its first position for simultaneous lifting of both transverse members by said drive means.

5. Can-palletizing equipment as defined in claim 3 in which the cans are open-top cans, and in which the fingers of at least one of said transverse members are spaced equal to the center-to-center spacing of the cans of the corresponding row and provide broad crests of a radius only slightly smaller than the can radius with said edges converging downwardly.

6. Can-palletizing equipment as defined in claim 3 including releasable lock means holding at least said second transverse member in its upper position.

7. Can-palletizing equipment as defined in claim 1 including a first carriage stop means in the path of said carriage engageable thereby to stop said carriage at said second position thereof overlying said pallet, a second carriage stop means in such path to stop said carriage at a slightly more advanced position overlying said pallet, and means for selectively moving said first and second carriage stop means into the path of said carriage.

8. Can-palletizing equipment for palletizing uniform-size cans carried forwardly by a conveyor in a laterally-confined way above the upper run thereof toward a pallet in a pallet zone at the end of said conveyor, said can-palletizing equipment including:
a carriage having a can-complement space open rearwardly at its rear end toward the cans advancing along said way and closed forwardly at its front end by a stop member disposed in the path of said advancing cans;
means for mounting said carriage to move forwardly and reardwardly between a first position in which said can-complement space overlies and opens downwardly on said upper run of said conveyor with said stop member thereabove near the end thereof and a second position in which said can-complement space overlies said pallet with said stop member adjacent the forward boundary of said pallet zone;
means for delivering cans to said conveyor while said carriage is in said first position, said stop member stopping the advance of said cans and forming the front row of a nested pattern of cans filling said can-complement space and extending upstream thereof rearwardly beyond said rear end of said carriage;
a can-holding means adjacent the rear end of said carriage when in said first position holding against advancement by said conveyor those cans of said nested pattern upstream of said filled can-complement space, movement of said carriage to said second position displacing said can-complement onto said pallet during the time said can-holding means holds such upstream nested-pattern cans;
a can-sweeping means above said can-complement space near the rear end thereof having depending can-advancing fingers spaced to engage the rear row of patterned cans in said can-complement space; and
means for attaching said can-sweeping means to said carriage for movement between an upper position in which said fingers clear the cans on said conveyor to a lower position in which said fingers engage the cans of said rear row to sweep same off said conveyor onto said pallet upon movement of said carriage to said second position.

9. Can-palletizing equipment for uniform-size cans, said equipment including in combination:
a main conveyor having an upper run and side plates forming thereabove a laterally-confined way extending between a can-receptive station and a pallet zone;
elevator means in said pallet zone successively presenting pallets at the end of said main conveyor substantially at the level of said upper run;
a carriage track at the end of said main conveyor extending in the direction thereof;
a carriage having an open-bottom laterally-confined can-complement space;
means mounting said carriage to move forwardly and rearwardly along said track between first and second positions in which the open-bottom of said can-complement space overlies and opens downward on an end portion of said upper run and on said pallet zone respectively, said laterally-confined can-complement space opening rearwardly on said laterally-confined way when said carriage is in said first position;
drive means for said main conveyor moving its upper run toward said pallet zone;
means at said can-receptive station delivering cans to said main conveyor, said cans being advanced by said upper run in random pattern toward said pallet zone;
a stop member at the forward end of said can-complement space in the path of forward movement of said cans stopping such forward movement thereof and forming a nested pattern of cans filling said can-complement space and extending upstream thereof rearwardly beyond the rear end of said carriage when in its first position;
can-holding means adjacent the rear end of said carriage when in its first position holding against advancement by said conveyor the front row of cans of the nested pattern upstream of said can-complement space during movement of said carriage to said second position; and
can-sweeping means carried by and movable with said carriage engaging the rearmost row of cans in said can complement space for sweeping said nested pattern of cans from said can-complement space onto a pallet in said pallet zone upon movement of said carriage toward said second position thereof.

10. Can-pelletizing equipment as defined in claim 9 in which said upper run provides a long portion between said end portion thereof and said can-receptive station, and a plurality of spaced transverse rollers below said long portion of said upper run supporting the overlying portion of said conveyor exclusively at the roller positions and disposing said overlying portion in a shallow hill-and-dale pattern with the hills respectively at the roller positions and with the dales respectively between such roller positions.

References Cited

UNITED STATES PATENTS

| | | | |
|---|---|---|---|
| 2,508,861 | 5/1950 | Jessen | 214—6 |
| 2,774,489 | 12/1956 | Guigas | 214—6 |
| 2,949,179 | 8/1960 | Busse | 214—6 |
| 2,988,195 | 6/1961 | McHugh | 214—6 |
| 3,056,515 | 10/1962 | Anderson | 214—8.5 |

FOREIGN PATENTS

| | | |
|---|---|---|
| 848,804 | 9/1960 | Great Britain. |

GERALD M. FORLENZA, *Primary Examiner.*

A. J. MAKAY, *Examiner.*

J. E. OLDS, *Assistant Examiner.*

UNITED STATES PATENT OFFICE
CERTIFICATE OF CORRECTION

Patent No. 3,389,810 June 25, 1968

Wayne F. Wolfe et al.

It is certified that error appears in the above identified patent and that said Letters Patent are hereby corrected as shown below:

Column 3, line 69, "equpment" should read -- equipment --. Column 14, line 53, "mans" should read -- means --; line 56, "paterned" should read -- patterned --. Column 15, line 13, "said" should read -- side --. Column 16, line 14, "open-bottom" should read -- open bottom --; line 45, "Can-pelletizing" should read -- Can-palletizing --.

Signed and sealed this 16th day of December 1969.

SEAL)

Attest:

Edward M. Fletcher, Jr.
Attesting Officer

WILLIAM E. SCHUYLER, JR.
Commissioner of Patents